US012053100B2

(12) United States Patent

Kigonya

(10) Patent No.: US 12,053,100 B2
(45) Date of Patent: Aug. 6, 2024

(54) POSTURE-ENFORCING SEAT

(71) Applicant: Godfrey Kigonya, Winooski, VT (US)

(72) Inventor: Godfrey Kigonya, Winooski, VT (US)

( * ) Notice: Subject to any disclaimer, the term of this patent is extended or adjusted under 35 U.S.C. 154(b) by 91 days.

(21) Appl. No.: 17/893,269

(22) Filed: Aug. 23, 2022

(65) Prior Publication Data

US 2024/0065444 A1 Feb. 29, 2024

(51) Int. Cl.
*A47C 7/50* (2006.01)
*A61G 15/02* (2006.01)
*A61G 15/12* (2006.01)

(52) U.S. Cl.
CPC ............ *A47C 7/5062* (2018.08); *A61G 15/02* (2013.01); *A61G 15/12* (2013.01)

(58) Field of Classification Search
CPC ....... A61G 15/02; A61G 15/12; A47C 7/5062
USPC .......................................... 297/423.2, 423.17
See application file for complete search history.

(56) References Cited

U.S. PATENT DOCUMENTS

| | | | | |
|---|---|---|---|---|
| 485,277 | A * | 11/1892 | Hunter | A61G 5/10 297/466 |
| 4,455,050 | A | 6/1984 | Kubek | |
| 4,542,936 | A * | 9/1985 | Gafken | A47C 7/024 297/240 |
| 5,040,522 | A | 8/1991 | Daniels | |
| 5,342,116 | A | 8/1994 | Walton | |
| 5,580,128 | A | 12/1996 | Johnson | |
| 5,806,929 | A | 9/1998 | Choi | |
| 6,123,392 | A | 9/2000 | Alfred | |
| 6,349,993 | B1 * | 2/2002 | Walsh | A47C 7/50 297/284.11 |
| 2020/0100930 | A1 | 4/2020 | Gilbert, Jr. | |

* cited by examiner

*Primary Examiner* — Milton Nelson, Jr.
(74) *Attorney, Agent, or Firm* — Kyle A. Fletcher, Esq.

(57) ABSTRACT

The posture-enforcing seat is a chair. The posture-enforcing seat is a therapeutic structure. The posture-enforcing seat is adapted for use with a patient. The posture-enforcing seat forms a physical boundary that limits the lateral motion of the thighs of the patient. The posture-enforcing seat comprises a chair structure and a plurality of corrective structures. The plurality of corrective structures attach to the chair structure. The plurality of corrective structures forms the boundary structure that limits the lateral motion of the thighs of the patient.

12 Claims, 6 Drawing Sheets

POSTURE-ENFORCING SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of chairs characterized by structural features. (A47C3/12)

SUMMARY OF INVENTION

The posture-enforcing seat is a chair. The posture-enforcing seat is a therapeutic structure. The posture-enforcing seat is adapted for use with a patient. The posture-enforcing seat forms a physical boundary that limits the lateral motion of the thighs of the patient. The posture-enforcing seat comprises a chair structure and a plurality of corrective structures. The plurality of corrective structures attach to the chair structure. The plurality of corrective structures forms the boundary structure that limits the lateral motion of the thighs of the patient.

These together with additional objects, features and advantages of the posture-enforcing seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the posture-enforcing seat in detail, it is to be understood that the posture-enforcing seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the posture-enforcing seat.

It is therefore important that the claims be regarded as including such equivalent construction insofar as they do not depart from the spirit and scope of the posture-enforcing seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
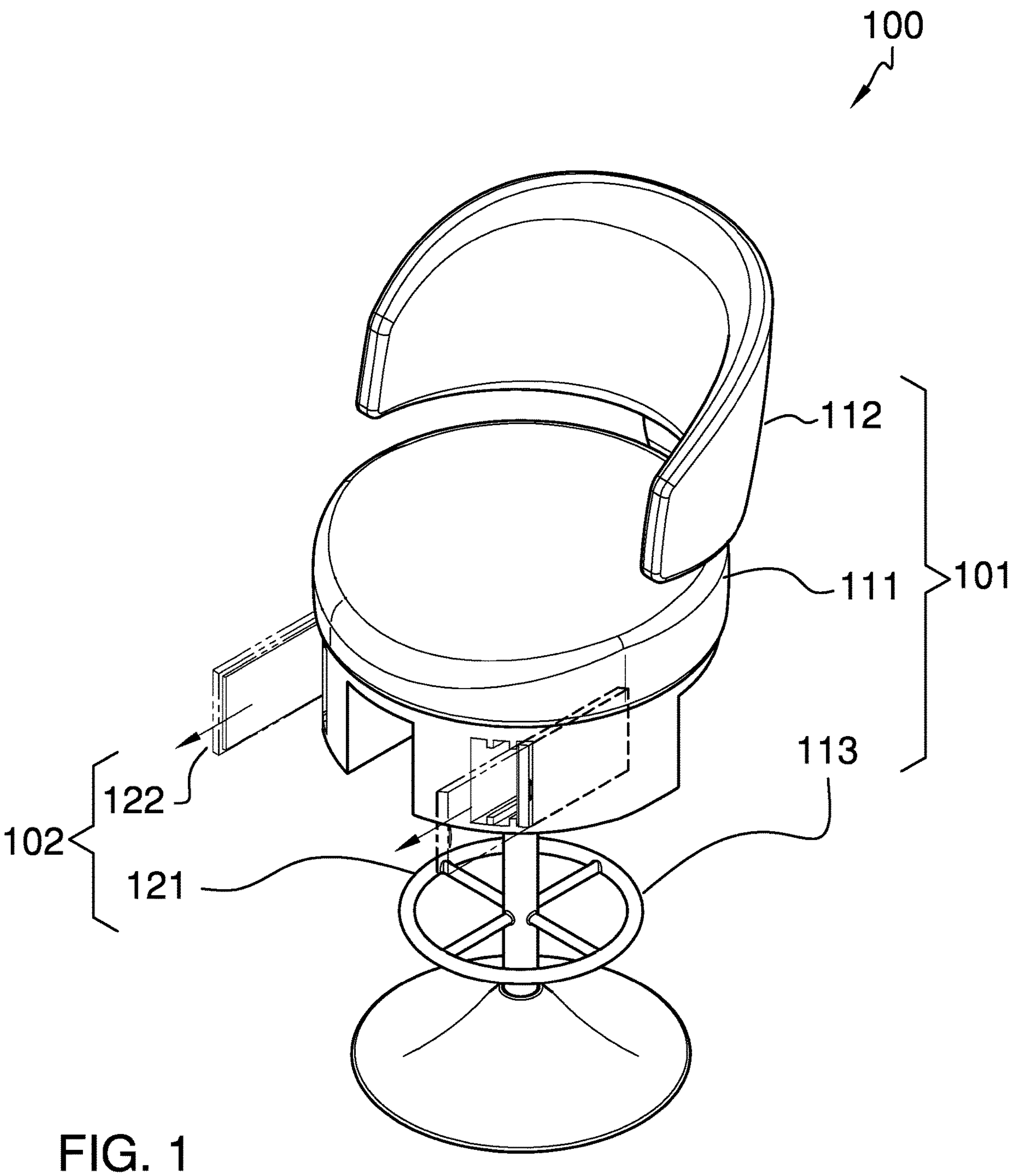
FIG. 1 is a perspective view of an embodiment of the disclosure.
Figure 2:
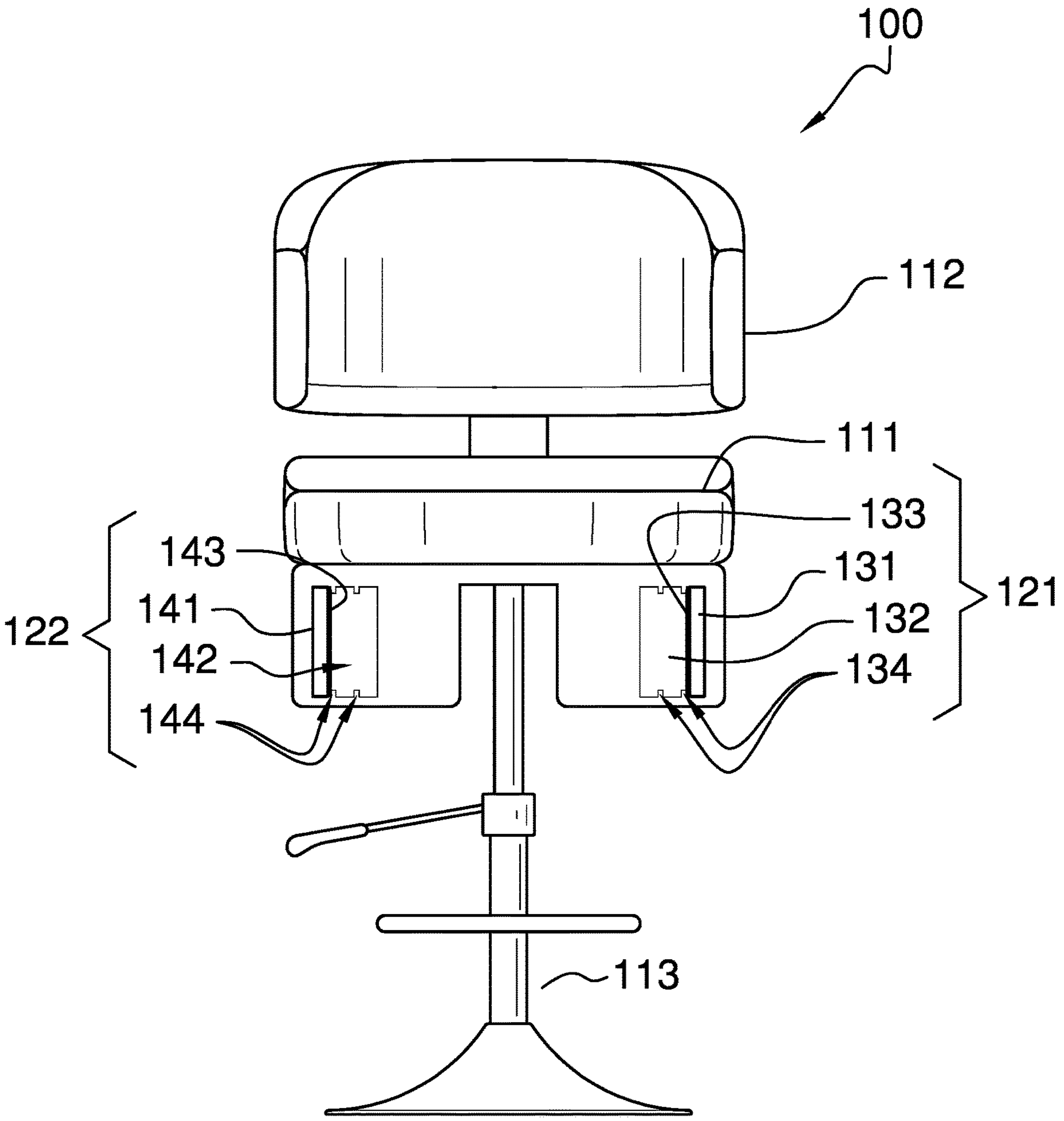
FIG. 2 is a front view of an embodiment of the disclosure.
Figure 3:
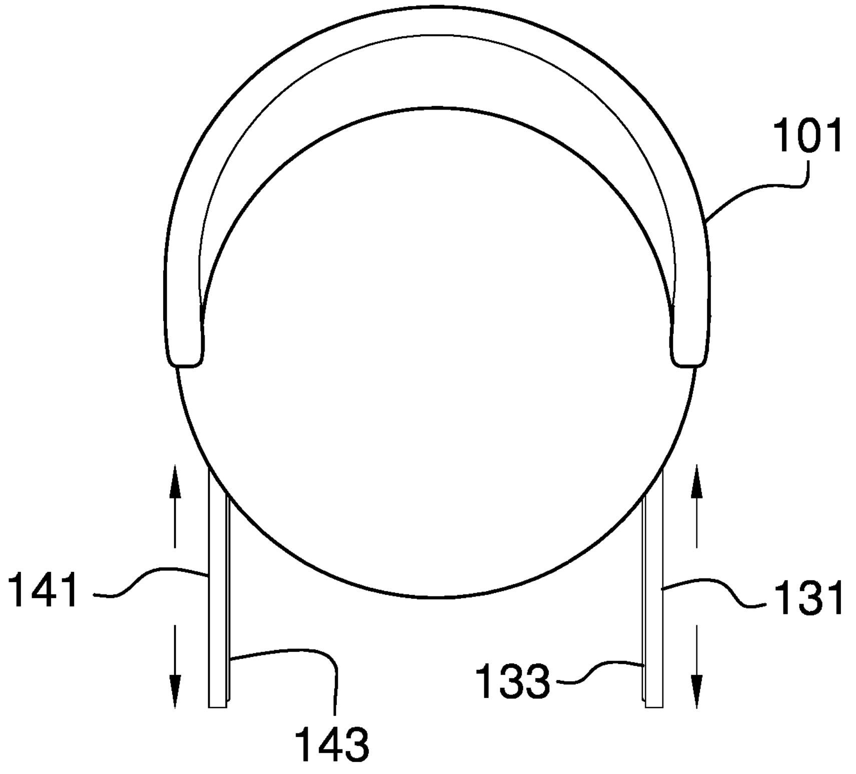
FIG. 3 is a top view of an embodiment of the disclosure.
Figure 4:
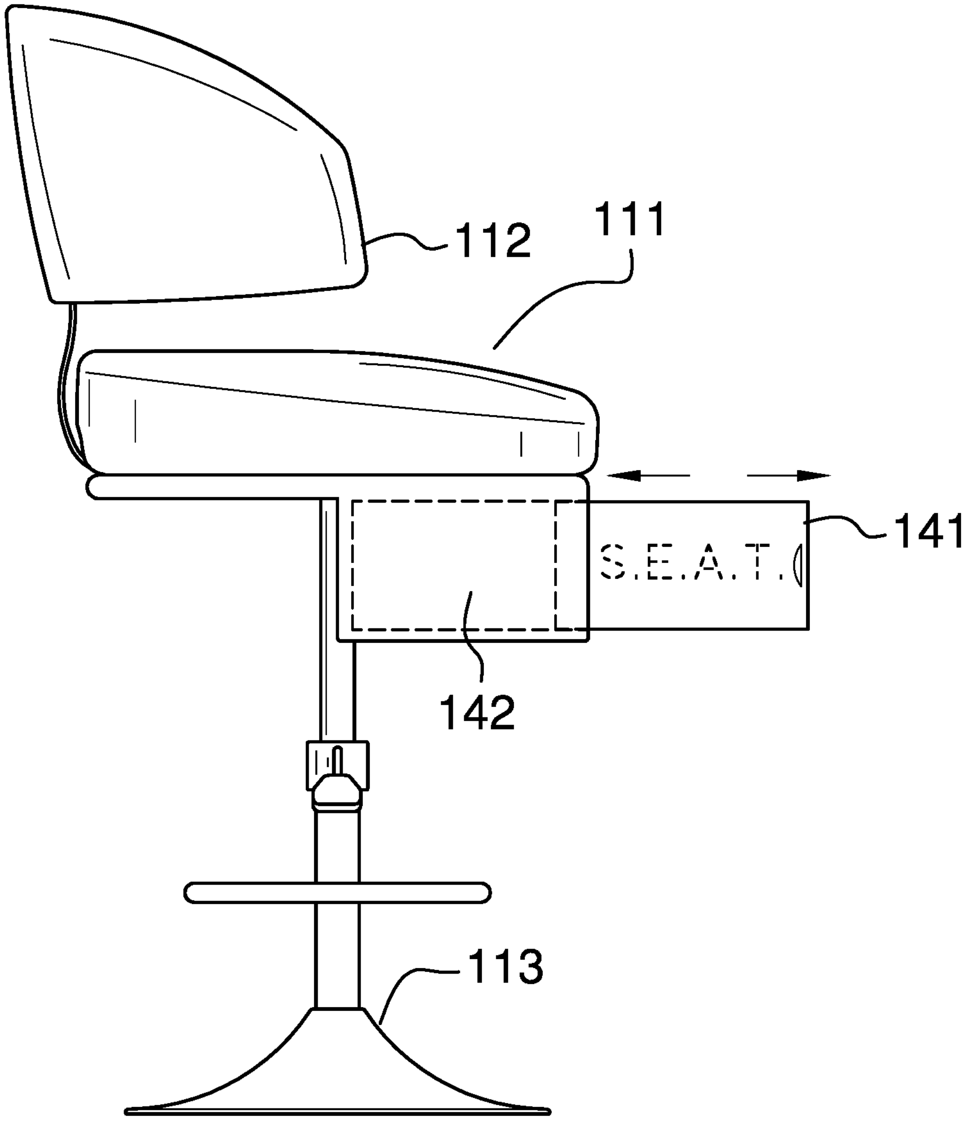
FIG. 4 is a side view of an embodiment of the disclosure.
Figure 5:
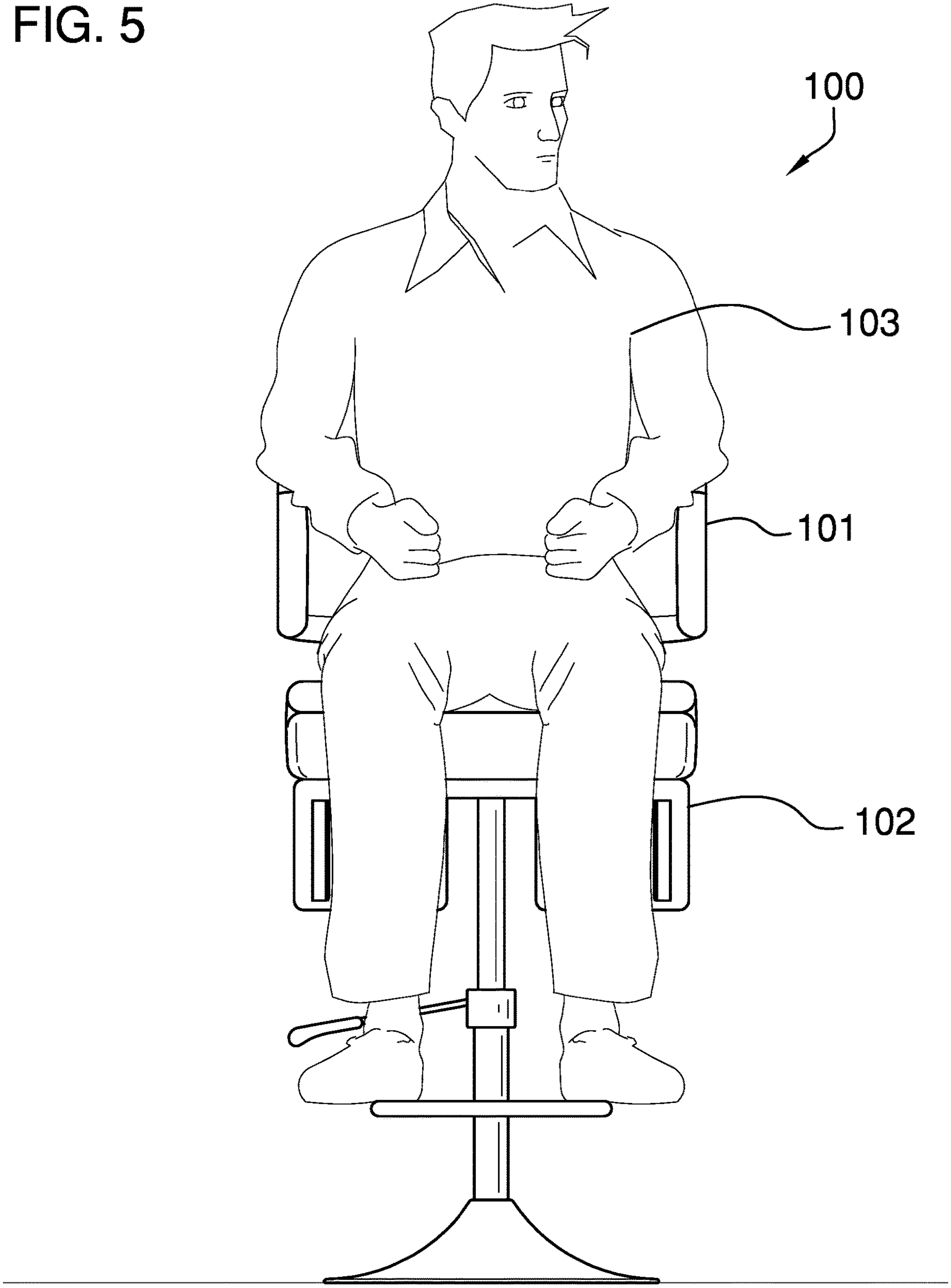
FIG. 5 is an in-use view of an embodiment of the disclosure.
Figure 6:
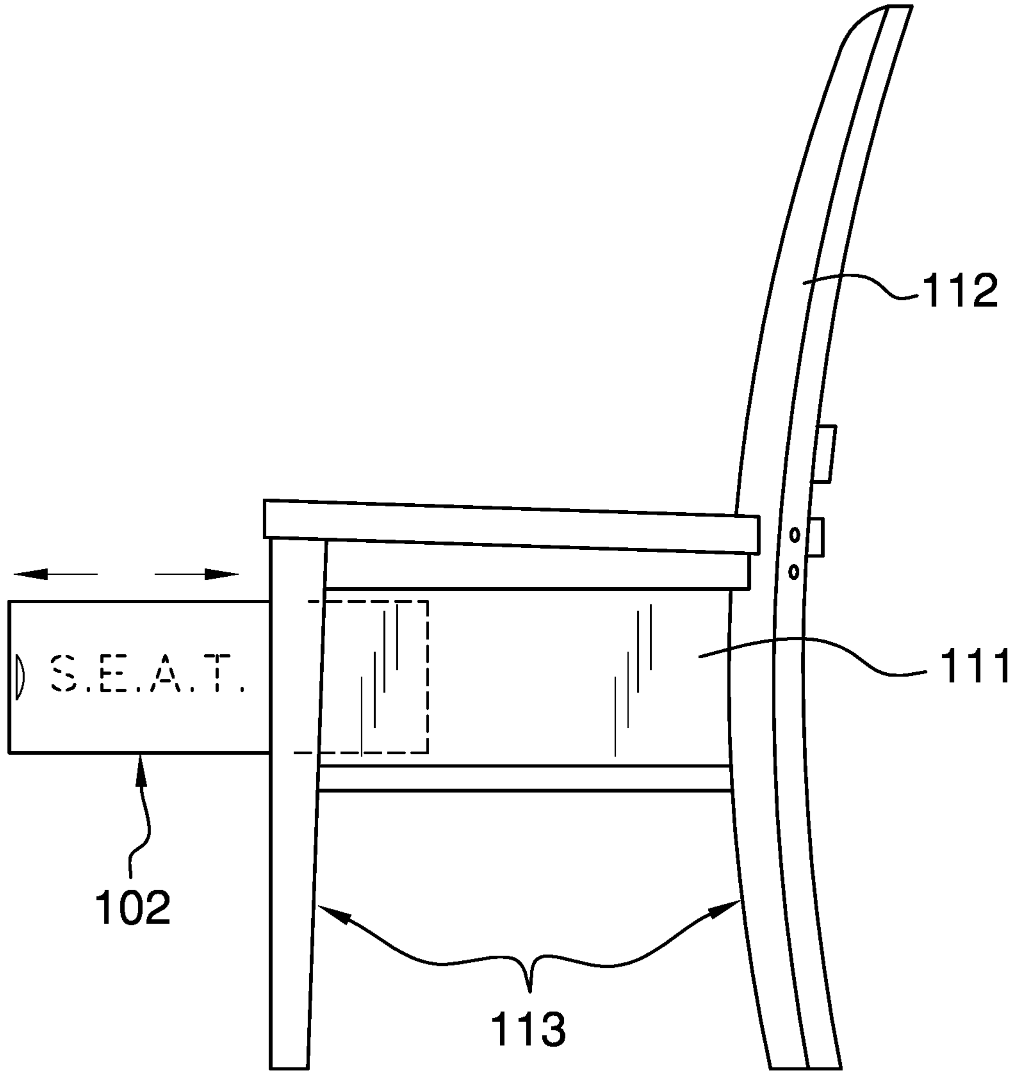
FIG. 6 is a side view of an alternate embodiment of the disclosure.

Detailed reference will now be made to one or more potential embodiments of the disclosure, which are illustrated in FIGS. 1 through 6.

The posture-enforcing seat 100 (hereinafter invention) is a chair. The invention 100 is a therapeutic structure. The invention 100 is adapted for use with a patient 103. The invention 100 forms a physical boundary that limits the lateral motion of the thighs of the patient 103. The invention 100 comprises a chair structure 101 and a plurality of corrective structures 102. The plurality of corrective structures 102 attach to the chair structure 101. The plurality of corrective structures 102 forms the boundary structure that limits the lateral motion of the thighs of the patient 103. The patient 103 is defined elsewhere in this disclosure.

The chair structure 101 is a furniture item. The chair structure 101 is a chair. The chair structure 101 forms a horizontally oriented platform on which the patient 103 rests. The chair structure 101 comprises a bench 111, a backrest 112, and a pedestal 113.

The bench 111 is a disk shaped structure. The bench 111 forms a horizontally oriented platform used to support the patient 103. The congruent end of the disk shaped structure of the bench 111 with the greatest surface area forms the superior surface of the bench 111. The bench 111 is defined elsewhere in this disclosure.

The backrest 112 is a vertically oriented structure. The backrest 112 is maintained in a superior position relative to the bench 111. The backrest 112 is positioned along the posterior boundary of the bench 111. The backrest 112 forms a structure used to support the patient 103 when the patient 103 sits in the chair structure 101.

The pedestal 113 is a load bearing structure. The pedestal 113 forms a stanchion. The pedestal 113 elevates the bench 111 and the backrest 112 above a supporting surface. The pedestal 113 forms a load path that transfers the loads of the bench 111, the backrest 112 and the patient 103 to the supporting surface. Optionally, the pedestal 113 can be configured to receive a footrest.

The plurality of corrective structures 102 is a mechanical structure. The plurality of corrective structures 102 forms the barrier structure that limits the range of motion of the thighs of the patient 103. The plurality of corrective structures 102 is a collapsible structure. The plurality of corrective structures 102 retracts into a storage position when the plurality of corrective structures 102 are not in use. The plurality of corrective structures 102 expands into a deployed position when the plurality of corrective structures 102 are in use. The plurality of corrective structures 102 mount on the inferior surface of the disk structure of the bench 111 of the chair structure 101. The plurality of corrective structures 102 deploys away from the bench 111 in the anterior direction. The plurality of corrective structures 102 comprises a left corrective structure 121 and a right corrective structure 122.

The left corrective structure 121 is a mechanical structure. The left corrective structure 121 is the component selected from the plurality of corrective structures 102 that is proximal to the left thigh of the patient 103. The left corrective structure 121 forms the barrier structure that limits the motion of the left thigh of the patient 103 in the lateral direction towards the left side of the patient 103. The left corrective structure 121 is independently deployed. By independently deployed is meant that the deployment and retraction of the left corrective structure 121 does not depend on the deployment and retraction of the right corrective structure 122. The left corrective structure 121 is an adjustable structure. By adjustable is meant that the span of the arc of the range of motion of the right thigh of the patient 103 allowed by the left corrective structure 121 can be changed by adjusting the left corrective structure 121.

The left corrective structure 121 comprises a left plate 131 and a left slot structure 132.

The left plate 131 is a disk shaped structure. The left plate 131 is contained within the left slot structure 132. The left plate 131 mounts in the left slot structure 132 such that the left plate 131 inserts into and deploys from the left slot structure 132. The left plate 131 mounts in the left slot structure 132 such that the congruent ends of the disk structure of the left plate 131 are parallel to the force of gravity. The left plate 131 forms the portion of the barrier structure that physically limits the range of lateral motion of the left thigh of the patient 103. The left plate 131 further comprises a left cushion structure 133.

The left cushion structure 133 is a cushion. The left cushion structure 133 mounts on the congruent end of the disk structure of the left plate 131 that is proximal to the left thigh of the patient 103. The left cushion structure 133 prevents injury to the left thigh of the patient 103.

The left slot structure 132 is a structure that mounts on the inferior congruent end of the disk structure of the bench 111 of the chair structure 101. The left slot structure 132 forms a negative space that the left plate 131 inserts into. The left plate 131 inserts into the left slot structure 132 for storage. The left plate 131 extends from the left slot structure 132 for deployment. The left slot structure 132 further comprises a left plurality of slots 134.

Each slot selected from the left plurality of slots 134 is a segmentation of the negative space formed by the left slot structure 132. Each slot selected from the left plurality of slots 134 is sized such that the left plate 131 inserts into any selected slot. The selection of a slot selected from the left plurality of slots 134 determines the span of the arc of the range of motion of the left thigh of the patient 103 that is allowed by the left plate 131.

The right corrective structure 122 is a mechanical structure. The right corrective structure 122 is the component selected from the plurality of corrective structures 102 that is proximal to the right thigh of the patient 103. The right corrective structure 122 forms the barrier structure that limits the motion of the right thigh of the patient 103 in the lateral direction towards the right side of the patient 103. The right corrective structure 122 is independently deployed. By independently deployed is meant that the deployment and retraction of the right corrective structure 122 does not depend on the deployment and retraction of the left corrective structure 121. The right corrective structure 122 is an adjustable structure. By adjustable is meant that the span of the arc of the range of motion of the right thigh of the patient 103 allowed by the right corrective structure 122 can be changed by adjusting the right corrective structure 122.

The right corrective structure 122 comprises a right plate 141 and a right slot structure 142.

The right plate 141 is a disk shaped structure. The right plate 141 is contained within the right slot structure 142. The right plate 141 mounts in the right slot structure 142 such that the right plate 141 inserts into and deploys from the right slot structure 142. The right plate 141 mounts in the right slot structure 142 such that the congruent ends of the disk structure of the right plate 141 are parallel to the force of gravity. The right plate 141 forms the portion of the barrier structure that physically limits the range of lateral motion of the right thigh of the patient 103. The right plate 141 further comprises a right cushion structure 143.

The right cushion structure 143 is a cushion. The right cushion structure 143 mounts on the congruent end of the disk structure of the right plate 141 that is proximal to the right thigh of the patient 103. The right cushion structure 143 prevents injury to the right thigh of the patient 103.

The right slot structure 142 is a structure that mounts on the inferior congruent end of the disk structure of the bench 111 of the chair structure 101. The right slot structure 142 forms a negative space that the right plate 141 inserts into. The right plate 141 inserts into the right slot structure 142 for storage. The right slot structure 142 extends from the right slot structure 142 for deployment. The right slot structure 142 further comprises a right plurality of slots 144.

Each slot selected from the right plurality of slots 144 is a segmentation of the negative space formed by the right slot structure 142. Each slot selected from the right plurality of slots 144 is sized such that the right plate 141 inserts into any selected slot. The selection of a slot selected from the right plurality of slots 144 determines the span of the arc of the range of motion of the right thigh of the patient 103 that is allowed by the right plate 141.

The left corrective structure 121 and the right corrective structure 122 are positioned such that the patient 103 sits between the left corrective structure 121 and the right corrective structure 122.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Arc: As used in this disclosure, an arc refers to a portion of a circumference or a curved perimeter. When applied to an angle or cant, the arc also refers to a measure of an angular span as measured from a circle at the vertex formed by the sides of the angle.

Backrest: As used in this disclosure, a backrest is a vertical or vertically canted supporting surface formed along the posterior side of a chair. The backrest supports the back of a person sitting in the chair.

Bench: As used in this disclosure, a bench is a horizontal supporting surface formed by a chair.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chair: As used in this disclosure, a chair is a structure that a person can sit on. The horizontal resting surface a person sits on is called the bench. Seat is a common synonym for a chair.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Cushion: As used in this disclosure a cushion is a pad or pillow formed from soft material that is used for resting, sleeping, or reclining. A cushion can also be used to prevent injury or damage.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Footrest: As used in this disclosure, a footrest is a structure formed along a lateral side of a chair. The armrest forms a structure on which a person can place a foot.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, lateral refers to a directional sense or location of the body. Specifically, lateral refers to an object or a side of an object that is proximal to the side or that is distal from the medial axis of the body. The lateral direction movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Medial: As used in this disclosure, medial refers to a directional sense or location of the body. Specifically, medial refers to a first object or a side of a first object that is closer to the medial axis or more distal from the side of the body relative to a second object or side of a second object.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pad: As used in this disclosure, a pad is a stack of individual sheets of a sheeting material. Pads are often assembled to allow for the distribution of individual sheets.

Patient: As used in this disclosure, a patient is a person who is designated to receive a medical treatment, therapy, or service. The term patient may be extended to an animal when used within the context of the animal receiving veterinary treatment or services.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Platform: As used in this disclosure, a platform is a raised horizontal surface that forms a load path to support objects placed on the superior surface of the platform.

Posterior: As used in this disclosure, posterior is a term that is used to refer to the side of an object that is distal or in the opposite direction of the anterior side. When comparing two items, the posterior item is the item that is distal from the anterior of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Therapeutic: As used in this disclosure, therapeutic is an adjective that refers to a medical, ameliorative, or hygienic substance, process, procedure, or device.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A posture-enforcing seat comprising
a chair structure and a plurality of corrective structures;
wherein the plurality of corrective structures attach to the chair structure;
wherein the chair structure comprises a bench, a backrest, and a pedestal;
wherein the pedestal elevates the bench and the backrest above a supporting surface;
wherein the plurality of corrective structures forms a barrier structure that is adapted to limit a range of motion of thighs of a patient;
wherein the plurality of corrective structures comprises a left corrective structure and a right corrective structure;
wherein the left corrective structure is a component selected from the plurality of corrective structures that is adapted to be proximal to a left thigh of the patient;
wherein the right corrective structure is a component selected from the plurality of corrective structures that is adapted to be proximal to a right thigh of the patient;
wherein the left corrective structure comprises a left plate and a left slot structure;
wherein the right corrective structure comprises a right plate and a right slot structure;
wherein the posture-enforcing seat is a therapeutic structure;
wherein the posture-enforcing seat is adapted for use with the left thigh and the right thigh of a patient;
wherein the posture-enforcing seat forms a physical boundary that limits the lateral motion of the thighs of the patient.

2. The posture-enforcing seat according to claim 1 wherein the plurality of corrective structures forms a boundary structure that limits the lateral motion of the thighs of the patient.

3. The posture-enforcing seat according to claim 2 wherein the chair structure forms a horizontally oriented platform on which the patient rests.

4. The posture-enforcing seat according to claim 3
wherein the bench is a disk shaped structure;
wherein the bench forms a horizontally oriented platform;
wherein a congruent end of the disk shaped structure of the bench with a greatest surface area forms a superior surface of the bench.

5. The posture-enforcing seat according to claim 4
wherein the backrest is a vertically oriented structure;
wherein the backrest is maintained in a superior position relative to the bench;
wherein the backrest is positioned along the posterior boundary of the bench.

6. The posture-enforcing seat according to claim 5
wherein the pedestal is a load bearing structure;
wherein the pedestal forms a stanchion;
wherein the pedestal forms a load path that transfers the loads of the bench, the backrest and the patient to the supporting surface.

7. The posture-enforcing seat according to claim 6
wherein the plurality of corrective structures is a collapsible structure;
wherein the plurality of corrective structures retracts into a storage position when the plurality of corrective structures are not in use;
wherein the plurality of corrective structures expands into a deployed position when the plurality of corrective structures are in use;
wherein the plurality of corrective structures mount on an inferior surface of the disk structure of the bench of the chair structure.

8. The posture-enforcing seat according to claim 7
wherein the left corrective structure is adapted to limit motion of the left thigh of the patient in the lateral direction towards the left side of the patient;
wherein the right corrective structure is a mechanical structure;
wherein the right corrective structure is adapted to limit motion of the right thigh of the patient in the lateral direction towards the right side of the patient.

9. The posture-enforcing seat according to claim 8
wherein the left corrective structure and the right corrective structure are positioned such that the patient is adapted to sit between the left corrective structure and the right corrective structure.

10. The posture-enforcing seat according to claim 9
wherein the left corrective structure is independently deployed;
wherein by independently deployed is meant that the deployment and retraction of the left corrective structure does not depend on the deployment and retraction of the right corrective structure;
wherein the right corrective structure is independently deployed;
wherein by independently deployed is meant that the deployment and retraction of the right corrective structure does not depend on the deployment and retraction of the left corrective structure.

11. The posture-enforcing seat according to claim 10
wherein the left corrective structure is an adjustable structure;
wherein by adjustable is meant that the span of the arc of the range of motion of the right thigh of the patient allowed by the left corrective structure is changed by adjusting the left corrective structure;
wherein the right corrective structure is an adjustable structure;
wherein by adjustable is meant that the span of the arc of the range of motion of the right thigh of the patient allowed by the right corrective structure is changed by adjusting the right corrective structure.

12. The posture-enforcing seat according to claim 11
wherein the left plate is a disk shaped structure;

wherein the left plate is contained within the left slot structure;

wherein the left plate mounts in the left slot structure such that the left plate inserts into and deploys from the left slot structure;

wherein the left plate mounts in the left slot structure such that the congruent ends of the disk structure of the left plate are parallel to the force of gravity;

wherein the left plate physically limits the range of lateral motion of the left thigh of the patient;

wherein the right plate is a disk shaped structure;

wherein the right plate is contained within the right slot structure;

wherein the right plate mounts in the right slot structure such that the right plate inserts into and deploys from the right slot structure;

wherein the right plate mounts in the right slot structure such that the congruent ends of the disk structure of the right plate are parallel to the force of gravity;

wherein the right plate physically limits the range of lateral motion of the right thigh of the patient;

wherein the left slot structure is a structure that mounts on the inferior congruent end of the disk structure of the bench of the chair structure;

wherein the left slot structure forms a negative space that the left plate inserts into;

wherein the left plate inserts into the left slot structure for storage;

wherein the left plate extends from the left slot structure for deployment;

wherein the right slot structure is a structure that mounts on the inferior congruent end of the disk structure of the bench of the chair structure;

wherein the right slot structure forms a negative space that the right plate inserts into;

wherein the right plate inserts into the right slot structure for storage;

wherein the right slot structure extends from the right slot structure for deployment.

* * * * *